United States Patent [19]

Hinz et al.

[11] Patent Number: 5,476,969
[45] Date of Patent: Dec. 19, 1995

[54] HIGHLY REACTIVE POLYOXYALKYLENE-POLYOLS CONTAINING TERTIARY AMINO GROUPS IN BONDED FORM, THEIR PREPARATION, AND THEIR USE FOR THE PREPARATION OF POLYISOCYANATE POLYADDITION PRODUCTS

[75] Inventors: Werner Hinz, Frankenthal; Stefan Adams, Ludwigshafen; Ulrich Koehler; Christian Maletzko, both of Mannheim; Klaus Vorspohl, Ludwigshafen; Ruth Zschiesche, Mannheim, all of Germany

[73] Assignee: BASF Aktiengesellschaft, Ludwigshafen, Germany

[21] Appl. No.: 952,376

[22] Filed: Sep. 28, 1992

[30] Foreign Application Priority Data

Oct. 29, 1991 [DE] Germany .................. 41 35 588.1

[51] Int. Cl.$^6$ .................................................. C07C 217/42
[52] U.S. Cl. .................. 564/505; 564/475; 544/162; 544/401; 546/246
[58] Field of Search ................... 564/512, 475, 564/505

[56] References Cited

U.S. PATENT DOCUMENTS

| | | | |
|---|---|---|---|
| 3,105,063 | 9/1963 | Damusis | 528/77 |
| 4,341,716 | 7/1982 | Diery et al. | 564/475 |
| 4,368,137 | 1/1983 | Bellos | 252/344 |
| 4,555,531 | 1/1991 | Christman | 521/167 |
| 4,992,587 | 2/1991 | Köll | 564/475 |
| 5,015,774 | 5/1991 | Suekane et al. | 564/475 |

FOREIGN PATENT DOCUMENTS

0047371A1  7/1981  European Pat. Off. .

OTHER PUBLICATIONS

Fakhriev et al., *Chem. Abs.*, vol. 97, 146981v (1982).

*Primary Examiner*—Glennon H. Hollrah
*Assistant Examiner*—Scott C. Rand
*Attorney, Agent, or Firm*—Paul L. Marshall

[57] ABSTRACT

The invention relates to highly reactive polyoxyalkylene-polyols prepared by oxyalkylation of an initiator molecule containing, in bonded form, at least 2 reactive hydrogen atoms and at least one tertiary amino group bonded via a spacer bridge, which preferably comprises an alkylene radical having at least 3 carbon atoms, by means of at least one alkylene oxide, preferably ethylene oxide and/or 1,2-propylene oxide, to a process for the preparation of these polyoxyalkylene-polyols, and to their use for the production of compact or cellular, preferably flexible polyisocyanate polyaddition products.

3 Claims, No Drawings

HIGHLY REACTIVE POLYOXYALKYLENE-POLYOLS CONTAINING TERTIARY AMINO GROUPS IN BONDED FORM, THEIR PREPARATION, AND THEIR USE FOR THE PREPARATION OF POLYISOCYANATE POLYADDITION PRODUCTS

The present invention relates to highly reactive polyoxyalkylene-polyols prepared by oxyalkylation of an initiator molecule containing, in bonded form, at least 2 reactive hydrogen atoms and at least one tertiary amino group bonded via a spacer bridge, which preferably comprises an alkylene radical having at least 3 carbon atoms, in particular by oxyalkylation of N,N-dimethyl-1,3-diaminopropane, N,N-dimethyl-1,4-diaminobutane or N,N-dimethyldipropylenetriamine, by means of at least one alkylene oxide, preferably ethylene oxide and/or 1,2-propylene oxide, to a process for the preparation of these polyoxyalkylene-polyols, and to their use for the preparation of compact or cellular, preferably flexible polyisocyanate polyaddition products.

In addition to organic polyisocyanates, compounds containing at least 2 reactive hydrogen atoms, e.g. polyamines or polyhydrbxyl compounds, are essential starting materials for the preparation of polyisocyanate polyaddition products. Examples of polyhydroxyl compounds, preferably relatively high-molecular-weight polyhydroxyl compounds, which have proven successful are hydroxyl-containing polyacetals, polyester-polyols and polyoxyalkylene-polyols.

Suitable polyoxyalkylene-polyols can be prepared by known processes, for example by anionic polymerization using alkali metal hydroxides, e.g. sodium hydroxide or potassium hydroxide, or alkali metal alkoxides, e.g. sodium methoxide, sodium ethoxide., potassium ethoxide or potassium isopropoxide, as catalysts and with addition of at least one initiator molecule, which usually contains 2 to 8 bonded reactive hydrogen atoms, or by cationic polymerization using Lewis acids, e.g. antimony pentachloride, boron fluoride etherate, inter alia, or bleaching earth as catalysts, from one or more alkylene oxides having 2 to 4 carbon atoms in the alkylene radical.

Suitable initiator molecules, as stated above, are compounds containing reactive hydrogen atoms. Specific examples are water, polycarboxylic acids, polyhydric, preferably low-molecular-weight alcohols, alkanolamines and aliphatic or aromatic polyamines. Preferred alkylene oxides are ethylene oxide, 1,2-propylene oxide or mixtures of ethylene oxide and 1,2-propylene oxide.

According to U.S. Pat. No. 2,674,619, polyoxyethylene-, polyoxypropylene- or polyoxypropylene-polyoxyethylenepolyols having molecular weights of at least 900 can be prepared in the manner described. Fully hydroxypropylated alkylenediamines having 2 to 6 carbon atoms in the alkylene radical are described in U.S. Pat. No. 2,697,113.

Rigid, rapidly curing polyurethane (abbreviated to PU below) compositions are prepared, according to DE-A-2 303 669 (U.S. Pat. No. 4,000,105), using polyoxyalkylenepolyols having hydroxyl equivalent weights of from 50 to less than 250 and which have been initiated by means of ammonia or aliphatic or aromatic polyamines.

U.S. Pat. No. 3,336,245 describes the preparation of tetrafunctional to hexafunctional polyoxyethylene- and polyoxypropylene-polyols based on aromatic diamines or triamines, e.g. tolylenediamine, and their use for the production of rigid PU foams. According to EP-A-0 208 512, polyoxyalkylene-polyols initiated by means of aminoalkylpiperazine are suitable as polyhydroxyl compounds for the production of rigid PU foam.

DE-C-2 711 735 (U.S. Pat. No. 4,144,386) describes a process for the production of flexible PU foams which are extremely soft. Polyoxyalkylene-polyols which are suitable for this purpose have a functionality of from 2 to 4, a hydroxyl equivalent weight of from 700 to 2200, and can be prepared using any difunctional to tetrafunctional alcohols, diamines or alkanolamines, e.g. pentaerythritol, ethylenediamine or triethanolamine.

While the use of amino compounds as initiator molecules achieves a significant increase in reactivity of polyoxyalkylene-polyols of low molecular weight, as are used, for example, for the production of rigid PU foams, compared with polyhydric alcohols in the reaction with polyisocyanates, this is not the case for polyoxy-alkylene-polyols of relatively high molecular weight, for example those having molecular weights of greater than 1800, as are employed, for example, for the production of soft PU foams. This different catalytic effect of amine-initiated polyoxyalkylene-polyols can be interpreted as meaning that the tertiary amino groups incorporated into the polyoxyalkylene chain are considerably screened by the high-molecular-weight, highly entangled polyoxyalkylene chains and thus lose their catalytic activity.

The rate of the polyaddition reaction of organic polyisocyanates and compounds containing reactive hydrogen atoms is affected by the reaction temperature and the presence of catalysts in addition to the structure of the starting materials.

Low-molecular-weight amine catalysts which are inert towards isocyanate groups, e.g. diazabicyclo[2.2.2]octane, bis(dimethylaminoethyl) ether or N,N,N'N'-tetramethylalkylenediamines, are frequently relatively volatile, have a strong odor and leave the polyaddition product slowly. In particular, films and coatings which occur in automobiles due to fogging have been found on analysis to contain amine catalysts as a constituent. The proportion of these volatile constituents in polyisocyanate polyaddition products must therefore be reduced. A target limit for the future is a value of less than 1 mg of condensate, measured by determining the fogging in accordance with DIN 75 201, method B. In order to be able to observe this limit, the use of volatile amine catalysts must be substantially avoided.

It is an object of the present invention to develop high-molecular-weight polyoxyalkylene-polyols containing tertiary amino groups whose catalytic activity is not adversely affected by the molecular-weight, so that the addition of low-molecular-weight tertiary amines as catalysts for the formation of polyisocyanate polyaddition products can be avoided to the greatest possible extent. The polyoxyalkylene-polyols should be suitable for the preparation of flexible, compact or cellular polyisocyanate polyaddition products, should be readily miscible with the other synthesis components, in particular conventional polyoxyalkylene-polyols containing no amino groups, and should be foamable in the absence of chlorofluorocarbons for the formation of microcellular PU elastomers or PU foams.

We have found that, surprisingly, this object is achieved by using selected initiator molecules containing tertiary amino groups, in which there is essentially a spatial separation between the tertiary amino groups and substituents containing reactive hydrogen atoms, for the formation of polyoxyalkylene-polyols.

The present invention accordingly provides highly reactive polyoxyalkylene-polyols prepared by oxyalkylation of an initiator molecule containing, in bonded form, at least two reactive hydrogen atoms and at least one tertiary amino group bonded via a spacer bridge, by means of at least one alkylene oxide.

The present invention furthermore provides a process for the preparation of the highly reactive polyoxyalkylene-polyols as claimed in claim 7 and the use of these compounds for the preparation of compact or cellular, flexible polyisocyanate polyaddition products as claimed in claim 10.

The polyoxyalkylene-polyols according to the invention retain their full catalytic activity even at high molecular weights, ie. at molecular weights of 2000 and above, since the catalytically active tertiary amino groups are not incorporated into the polyoxyalkylene chain, as in the case of polyoxyalkylene-polyols initiated by means of ammonia or primary amines, but instead are bonded in the molecule via a sufficiently large bridge, known as a spacer bridge, at a distance from the centers having reactive hydrogen atoms. Polyoxyalkylenepolyols of this type with tertiary amino groups bonded via spacers are extremely catalytically active, so that even polyoxypropylene-polyoxyethylene-polyols having an ethylene oxide unit content in the end block of only 5% by weight, which is very low for polyoxyalkylene-polyols for soft PU foams, may be easily processed without addition of low-molecular-weight tertiary amines as catalyst.

The polyoxyalkylene-polyols according to the invention, preferably polyoxypropylene-polyols, polyoxyethylene-polyols and in particular polyoxypropylene-polyoxyethylene-polyols, have a functionality of at least 2, preferably 2 to 4, in particular 2 to 3, and a molecular weight of from 2000 to 10,000, preferably from 2400 to 6200, in particular from 2800 to 4200, and are prepared, as stated above, by oxyalkylation of an initiator molecule containing, in bonded form, at least 2 reactive hydrogen atoms and at least one tertiary amino group bonded via a spacer bridge, by means of at least one alkylene oxide.

Specific examples of substituents containing reactive hydrogen atoms in the initiator molecule which are suitable for oxyalkylation are the thiol, carboxyl, secondaryamino and preferably hydroxyl and in particular primary amino groups.

Examples of suitable spacer bridges are difunctional, at least six-membered heterocyclic or advantageously difunctional aromatic radicals, e.g. the phenylene, naphthylene and diphenylene radicals and radicals of the structure

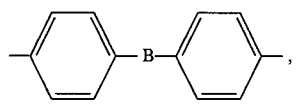

where B is a —CH$_2$—, —CH$_2$—CH$_2$—,

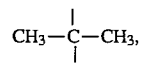

—SO$_2$—, —S— or —O— bridge.

Spacer bridges which are highly suitable and are therefore preferred are alkylene radicals having at least carbon atoms, preferably 3 to 6 carbons, in particular 3 or 4 carbon atoms, it being possible for the alkylene radical to contain bonded ether or thioether bridges.

Examples of tertiary amino groups are those described below.

Suitable initiator molecules are in particular compounds of the formula

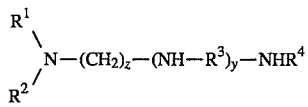

where $R^1$ and $R^2$ are identical or different, linear or branched $C_1$- to $C_4$-alkyl, both radicals together are $C_4$- to $C_6$-cycloalkylene, which may contain an —O— or —NR$^5$— bridge where $R^5$ is $C_1$- to $C_4$-alkyl, in place of a methylene bridge, or are identical or different dialkylaminoalkyl of the formula

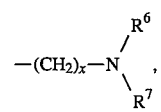

where $R^6$ and $R^7$ are identical or different, linear or branched $C_1$- to $C_4$-alkyl, or the two radicals together are $C_4$- to $C_6$-cycloalkylene, which may contain an —O— or —NR$^5$— bridge in bonded form in place of a methylene group, and x is an integer of at least 3, preferably of from 3 to 6, z is an integer of at least 3, preferably from 3 to 6, in particular 3 or 4

$R^3$ is $C_2$- to $C_4$-alkylene, preferably $C_2$- or $C_3$-alkylene, y is zero or 1 to 3, preferably zero or one, and $R^4$ is hydrogen or $C_1$- to $C_4$-alkyl, with the proviso that $R^4$ is hydrogen if y is zero.

Specific examples which may be mentioned of radicals $R^1$, $R^2$, $R^4$, $R^5$, $R^6$ and $R^7$ are ethyl, n-propyl, isopropyl, n-butyl, sec-butyl and preferably methyl. Examples of catalytically active radicals which contain at least one tertiary amino group are thus, in the simplest and preferred case, dialkylamino, in particular dimethylamino. However, tertiary amino groups having cyclic structures, e.g.

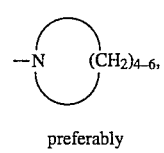

preferably

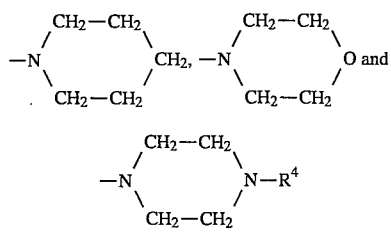

or tertiary amines substituted by additional dialkylaminoalkyl groups, which can have, for example, the following structure:

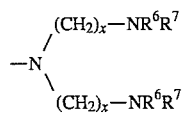

are also suitable. The spacer bridge $(CH_2)_z$ is, in particular, an n-propyiene or n-butylene radical.

Preferred initiator molecules for the preparation of the highly reactive polyoxyalkylene-polyols according to the invention are thus N,N-dimethyl-1,3-diaminopropane, N,N-dimethyl-1,4-diaminobutane and N,N-dimethyldipropylenetriamine.

In addition to the ethylene oxide, 1,2-propylene oxide and mixtures of ethylene oxide and 1,2-propylene oxide mentioned above as alkylene oxides and preferably used, 1,2- and 2,3-butylene oxide, for example, are also suitable. For the oxyalkylation, the alkylene oxides can be used individually, alternately one after the other or as mixtures.

The polyoxyalkylene-polyols according to the invention can be prepared by methods known per se. According to a preferred embodiment, the initiator molecules which can be used according to the invention are oxyalkylated in 2 or more reaction steps. In the 1st reaction step, the oxyalkylation is preferably carried out without a catalyst, expediently at atmospheric pressure and at from 90° to 150° C., preferably at from 100° to 130° C. When the reactive hydrogen atoms of the initiator molecule have been saturated by alkylene oxide, the anionic polymerization of the alkylene oxides is completed in the 2nd and, if appropriate, subsequent reaction steps in the presence of alkali metal hydroxides, e.g. sodium hydroxide or potassium hydroxide, or alkali metal alkoxides, e.g. sodium methoxide, sodium ethoxide, potassium ethoxide, potassium isopropoxide or sodium butoxide, as catalysts. To this end, hydroxyl groups of the initiator molecules saturated with alkylene oxide are partially converted into the corresponding alkoxides. Depending On the catalyst used, any water or low-boiling alcohol formed is removed by distillation, and the alkylene oxide or alkylene oxide mixture is introduced into the reaction medium at from 90° to 150° C., preferably at from 100° to 130° C. at the rate at which it reacts, for example over the course of 4 to 30 hours, preferably from 6 to 12 hours, at atmospheric pressure or if desired at superatmospheric pressure of from 1.1 to 20 bar, preferably from 1.1 to 7 bar. When the oxyalkylation is complete or in the preparation of block polyoxyalkylene-polyols, after the formation of each alkylene oxide block, the excess alkylene oxide is removed by distillation at from 90° to 150° C. under reduced pressure, for example at from 0.01 to 20 mbar, preferably at from 0.1 to 10 mbar.

The polyoxyalkylene-polyols prepared, preferably containing alkali metal ions, are expediently purified by known methods by addition of organic acids, e.g. citric acid, acetic acid, formic acid, inter alia, or inorganic acids, e.g. sulfuric acid, phosphoric acid or carbonic acid, and if desired with addition of adsorbents.

The highly reactive polyoxyalkylene-polyols according to the invention are preferably used for the preparation of compact or preferably cellular, flexible polyisocyanate polyaddition products, in particular soft, elastic PU foams, which can be prepared in the absence of volatile tertiary amines as catalysts and without addition of chlorofluorocarbon-containing blowing agents.

For the preparation of the flexible, compact or cellular polyisocyanate polyaddition products, preferably soft, elastic PU foams, the highly reactive polyoxyalkylene-polyols according to the invention can be used as the only polyhydroxyl compound (a). However, it may be expedient, in order to modify the mechanical properties of the polyisocyanate polyaddition products or for processing reasons, to use, as polyhydroxyl compounds a), mixtures containing or preferably comprising, based on the total weight, ai) at least 10% by weight, preferably at least 25% by weight, in particular at least 50% by weight, of at least one highly reactive polyoxyalkylene-polyol according to the invention, and aii) a maximum of 90% by weight, preferably a maximum of 75% by weight, in particular a maximum of 50% by weight, of at least one polyoxyalkylene-polyol having a functionality of from 2 to 8 and a molecular weight of from 500 to 8000, preference being given to polyoxyalkylene-polyols having a functionality of from 2 to 3 and a molecular weight of from 2800 to 6200 for the preparation of elastic polyisocyanate polyaddition products, to polyoxyalkylene-polyols having a functionality of from 3 to 4 and a molecular weight of from 1100 to 3000 for the preparation of semirigid polyisocyanate polyaddition products, and to polyoxyalkylene-polyols having a functionality of from 3 to 6 and a molecular weight of from 500 to 1500 for the preparation of rigid polyisocyanate polyaddition products.

Polyoxyalkylene-polyol mixtures of (ai) and (aii) of this type are sufficiently catalytically active for it to be possible likewise essentially to omit the addition of volatile tertiary amine catalysts.

The polyoxyalkylene-polyols (aii) suitable for this purpose can be prepared by known processes, for example by anionic polymerization, as described above, in the presence of basic catalysts using difunctional to octafunctional initiator molecules, or by cationic polymerization using Lewis acids, such as antimony pentachloride, boron trifluoride etherate, inter alia, or bleaching earth as catalysts, from one or more alkylene oxides having 2 to 4 carbon atoms in the alkylene radical, for example tetrahydrofuran, 1,3-propylene oxide, 1,2- or 2,3-butylene oxide, styrene oxide or epichlorohydrin, preferably ethylene oxide and/or 1,2-propylene oxide. The alkylene oxides can likewise be used individually, alternately one after the other or as mixtures.

Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituteddiamines having 1 to 4 carbon atoms in the alkyl radical, such as unsubstituted or mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Other suitable initiator molecules are alkanolamines, such as ethanolamine, diethanolamine, N-methyl- and N-ethylethanolamine, N-methyl- and N-ethyldiethanolamine and triethanolamine, and ammonia.

Preference is given to polyhydric alcohols or oxyalkylene glycols, in particular having three or more hydroxyl groups, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose.

Other suitable polyoxyalkylene-polyols (aii) are melamine/polyether-polyol dispersions as described in EP-A-23 987 (U.S. Pat. No. 4,293,657), polymer/polyether-polyol dispersions, prepared from polyepoxides and epoxy resin curing agents in the presence of polyether-polyols as described in DE-A-2 943 689 (U.S. Pat. No. 4,305,861), dispersions of aromatic polyesters in polyhydroxyl compounds, as described in EP-A-62 204 (U.S. Pat. No. 4,435, 537) or DE-A-3 300 474, dispersions of organic and/or inorganic fillers in polyhydroxyl compounds, as described in EP-A-11 751 (U.S. Pat. No. 4,243,755), polyurea/polyether-polyol dispersions, as described in DE-A-3 125 402, tris(hydroxyalkyl) isocyanurate/polyether-polyol dispersions, as described in EP-A-136 571 (U.S. Pat. No. 4,514,526), and crystallite suspensions, as described in DE-A-3 342 176 and DE-A-3 342 177 (U.S. Pat. No. 4,560,708); the comments in said patent publications should be considered as part of this patent description.

In place of the abovementioned polyoxyalkylene-polyols (aii) or in combination with these, it may be expedient, in order to modify the mechanical properties of the polyisocyanate polyaddition products, preferably the soft PU foams, additionally to use low-molecular-weight chain extenders (b) for their preparation.

Suitable chain extenders (b) are polyfunctional compounds, in particular difunctional or trifunctional compounds, having molecular weights of from 18 to about 400, preferably from 62 to about 300. For example, dialkanolamines and/or trialkanolamines, e.g. diethanolamine and triethanolamine, aliphatic diols and/or triols having 2 to 6 carbon atoms in the alkylene radical, e.g. ethanediol, 1,4-butanediol, 1,5-pentanediol, 1,6-hexanediol, glycerol and/or trimethylolpropane, and low-molecular-weight ethoxylation and/or propoxylation products, prepared from the abovementioned dialkanolamines, trialkanolamines, diols and/or triols, and aliphatic and/or aromatic diamines, e.g. 1,2-ethanediamine, 1,4-butanediamine, 1,6-hexanediamine, 2,3-, 2,4- and/or 2,6-tolylenediamine, 4,4'-diaminodiphenylmethane, 3,3'-di- and/or 3,3',5,5'-tetraalkyl-substituted 4,4'-diaminodiphenylmethanes as initiator molecules and alkylene oxide or mixtures thereof are used.

Preferred chain extenders (b) are dialkanolamines, diols and/or triols and in particular 1,6-hexanediol, diethanolamine, trimethylolpropane and glycerol, or mixtures thereof.

The chain extenders (b) preferably used for the production of the soft PU foams may expediently be used in such amounts by weight that from 0.01 to 8 mol, in particular from 0.1 to 3 mol, of chain extender (b) are present in the reaction mixture per mole of polyoxyalkylene-polyol or polyoxyalkylene-polyol mixture (a).

Known organic (for example aliphatic, cycloaliphatic or preferably aromatic) diisocyanates and/or polyisocyanates (c) are suitable for the preparation of the polyisocyanate polyaddition products, preferably the soft PU foams. Specific examples of aromatic polyisocyanates are mixtures of 4,4'- and 2,4'-diphenylmethane diisocyanate (MDI), mixtures of MDI and polyphenylpolymethylene polyisocyanates (crude MDI), expediently containing at least 35%, preferably from 50 to 90% or more, based on the total weight of the mixture, of MDI isomers, 2,4- and 2,6-tolylene diisocyanate, and the corresponding commercially available isomer mixtures, mixtures of tolylene diisocyanates and MDI and/or crude MDI, for example those containing from 30 to 90% by weight, preferably from 40 to 80% by weight, of MDI, based on the total weight of the crude MDI.

Also suitable are so-called modified polyisocyanates, ie. products obtained by chemical reaction of organic diisocyanates and/or polyisocyanates. Specific examples are diisocyanates and/or polyisocyanates containing ester, urea, biuret, allophanate, isocyanurate and preferably carbodiimide, uretonimine and/or urethane groups. Examples of suitable compounds are prepolymers containing urethane groups and containing from 14 to 2.8% by weight, preferably from 12 to 3.5% by weight, of NCO, or quasiprepolymers containing from 35 to 14% by weight, preferably from 34 to 22% by weight, of NCO, polyisocyanates modified by means of urethane groups and prepared from tolylene diisocyanates having, in particular, an NCO content of from 34 to 28% by weight, and those prepared from 4,4'-MDI, 4,4'- and 2,4'-MDI isomer mixtures or crude MDI having, in particular, an NCO content of from 28 to 22% by weight, based on the total weight, and being prepared by reacting diols, oxyalkylene glycols and/or polyoxyalkylene glycols having molecular weights of from 62 to 6000, preferably from 134 to 4200, with tolylene diisocyanates, 4,4'-MDI, MDI isomer mixtures and/or crude MDI, for example at temperatures of from 20° to 110° C., preferably from 50° to 90° C., specific examples of oxyalkylene glycols and polyoxyalkylene glycols, which can be employed individually or as mixtures, being diethylene glycol, dipropylene glycol, polyoxyethylene glycol, polyoxypropylene glycol and polyoxypropylene-polyoxyethylene glycol, polyisocyanates containing carbodiimide groups and/or isocyanurate groups, for example based on MDI isomers and/or tolylene diisocyanate.

However, mixtures of 4,4'- and 2,4'-MDI, crude MDI containing at least 35% by weight of MDI, based on the total weight, mixtures of 4,4'- and 2,4'-MDI and mixtures of 2,4- and 2,6-TDI, mixtures of crude MDI and mixtures of 2,4- and 2,6-TDI, polyisocyanate mixtures containing urethane groups and containing from 28 to 14% of NCO, based on the total weight, and based on MDI and/or crude MDI, have proven particularly successful and are therefore preferred.

In order to accelerate the reaction of the highly reactive polyoxyalkylene-polyol, polyoxyalkylene-polyol mixture of (ai) and (aii) or preferably mixture of (ai) or (ai) and (aii), water as blowing agent (e) and, if desired, chain extender (b) with the organic polyisocyanate and/or modified polyisocyanate (c), synergistic catalysts (d) can additionally be introduced into the reaction mixture. Compounds which are highly suitable for this purpose are metal salts, such as iron(II) chloride, zinc chloride, lead octanoate, and preferably tin salts, such as tin dioctanoate, tin diethylhexanoate and dibutyltin dilaurate, which are usually employed in an amount of from 0.01 to 0.5% by weight, preferably from 0.03 to 0.25% by weight, based on the weight of the polyoxyalkylene-polyol or polyoxyalkylene-polyol mixture (a).

Blowing agents (e) which can be used to prepare cellular polyisocyanate polyaddition products, preferably soft PU foams, preferably include water, which reacts with isocyanate groups to form carbon dioxide. The amount of water expediently employed is from 0.1 to 8 parts by weight, preferably from 1.5 to 5.0 parts by weight, in particular from 2.5 to 3.5 parts by weight, based on 100 parts by weight of the polyoxyalkylene-polyol or polyoxyalkylene-polyol mixture (a).

It is also possible to employ physical blowing agents in a mixture with water. Liquids which are inert toward the organic, modified or unmodified polyisocyanates (c) and have boiling points of below 100° C., preferably below 50° C., in particular from −50° C. to 30° C., at atmospheric pressure, so that they evaporate under the influence of the exothermic polyaddition reaction, are suitable. Examples of preferred liquids of this type are hydrocarbons, such as n- and isopentane, preferably technical-grade mixtures of n- and isopentanes, n- and isobutane, and propane, ethers, such as furan, dimethyl ether and diethyl ether, ketones, such as acetone and methyl ethyl ketone, alkyl carboxylates, such as methyl formate, dimethyl oxalate and ethyl acetate, and halogenated hydrocarbons, such as methylene chloride, dichloromonofluoromethane, difluoromethane, difluorochloromethane, trifluoromethane, difluoroethane, tetrafluoroethane, heptafluoropropane, 1-chloro-2,2-difluoroethane (142), 1-chloro-1,1-difluoroethane (142b) and 1-chloro-1,2-difluoroethane (142a). it is also possible to use mixtures of these low-boiling liquids with one another, for example mixtures of difluorochloromethane and 142b and/or with other substituted or unsubstituted hydrocarbons. Other suitable blowing agents are organic carboxylic acids, e.g. formic acid, acetic acid, oxalic acid, ricinoleic acid and compounds containing carboxyl groups.

The amount of physical blowing agent necessary in addition to water can be determined in a simple manner depending on the desired foam density and is approximately from 0 to 25 parts by weight, preferably from 0 to 15 parts by weight, per 100 parts by weight of the polyoxyalkylene-polyol or polyoxyalkylene-polyol mixture (a). It may be expedient to mix the modified or unmodified polyisocyanate (c) with the inert physical blowing agent and thus to reduce the viscosity.

It is also possible, if desired, to introduce assistants and/or additives (f) into the reaction mixture for the preparation of polyisocyanate polyaddition products, preferably the soft PU foams. Examples which may be mentioned are surfactants, foam stabilizers, cell regulators, fillers, dyes, pigments, flameproofing agents, hydrolysis-protection agents, and fungistatic and bacteriostatic substances.

Examples of suitable surfactants are compounds which serve to support homogenization of the starting materials and may also be suitable for regulating the cell structure. Examples which may be mentioned are emulsifiers, such as sodium salts of castor oil sulfates or of fatty acids, and salts of fatty acids with amines, e.g. diethylammonium oleate, diethanolammonium stearate and diethanolammonium ricinoleate, salts of sulfonic acids, e.g. alkali metal or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, esters of castor oil or ricinoleic acid, turkey red oil and groundnut oil, and cell regulators, such as paraffins, fatty alcohols and dimethylpolysiloxanes. In order to improve the emulsification action, the cell structure and/or to stabilize the foam, oligomeric polyacrylates containing polyoxyalkylene and fluoroalkane radicals as side groups are also suitable. The surfactants are usually used in amounts of from 0.01 to 5 parts by weight, based on 100 parts by weight of the polyoxyalkylene-polyol or polyoxyalkylene-polyol mixture (a).

For the purposes of the present invention, fillers, in particular reinforcing fillers, are taken to mean conventional organic and inorganic fillers, reinforcing agents, weighting agents, agents for improving the abrasion behavior in paints, coating compositions, etc. Specific examples which may be mentioned are inorganic fillers, such as silicate minerals, for example phyllosilicates, such as antigorite, serpentine, hornblende, amphibole, chrisotile, zeolites and talc; metal oxides, such as kaolin, aluminum oxides, aluminum silicate, titanium oxides and iron oxides, metal salts, such as chalk, feldspar and inorganic pigments, such as cadmium sulfide, zinc sulfide, and glass particles. Examples of suitable organic fillers are carbon black, melamine, collophony, cyclopentadienyl resins and graft polymers.

The inorganic and organic fillers may be used individually or as mixtures and are advantageously introduced into the reaction mixture in amounts of from 0.5 to 50% by weight, preferably from 1 to 40% by weight, based on the weight of components (a) to (c).

Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)ethylene diphosphate.

In addition to the abovementioned halogen-substituted phosphates, it is also possible to use inorganic flameproofing agents, such as red phosphorus, aluminum oxide hydrate, antimony trioxide, arsenic oxide, ammonium polyphosphate and calcium sulfate, or cyanuric acid derivatives, e.g. melamine, or mixtures of at least two flameproofing agents, e.g. ammonium polyphosphate and melamine, and, if desired, starch for flameproofing the polyisocyanate polyaddition products, preferably soft PU foams, prepared according to the invention. In general, it has proven expedient to use from 5 to 50 parts by weight, preferably from 5 to 25 parts by weight, of said flameproofing agents or flameproofing agent mixtures per 100 parts by weight of components (a) to (c).

Further details on the other conventional assistants and additives mentioned above are given in the specialist literature, for example in the monograph by J. H. Saunders and K. C. Frisch, High Polymers, Volume XVI, Polyurethanes, parts 1 and 2, Interscience Publishers, 1962 and 1964 respectively, or Kunststoff-Handbuch, Polyurethane, Volume VII, Carl-Hanser-Verlag, Munich, Vienna, 1st and 2nd Editions, 1966 and 1983.

To produce the polyisocyanate polyaddition products, preferably the soft PU foams, the organic, modified or unmodified polyisocyanates (c), the polyoxyalkylene-polyols or polyoxyalkylene-polyol mixtures (a) and, if desired, chain extenders (b) are reacted at from 0° to 100° C., preferably at from 15° to 80° C., in the presence of if desired catalysts (d), if desired blowing agents (e), and if desired assistants and/or additives (f), in such mixing ratios that from 0.5 to 2, preferably from 0.8 to 1.3, in particular approximately one, reactive hydrogen atom(s) is (are) bonded to the starting components (a) and, if used, (b) per NCO group. The molar ratio between the number of equivalents of water and the number of equivalents of NCO groups is advantageously from 0.5 to 5:1, preferably from 0.7 to 0.95:1, in particular from 0.75 to 0.85:1. To prepare polyisocyanate polyaddition products containing isocyanurate groups, the ratio between NCO groups and reactive hydrogen atoms is expediently from 2 to 25:1, preferably from 2 to 10:1.

The polyisocyanate polyaddition products, preferably the soft PU foams, are expediently produced by the one-shot process by mixing two components A and B, starting components (a), (d), (e) and, if used, (b) and (f) being combined to form component A, and starting component (c), if desired mixed with (f) and inert, physical blowing agents, being used as component B. Components A and B need only be mixed vigorously before production of the polyisocyanate polyaddition products, preferably the soft PU foams. The reaction mixture can be foamed and cured in open or closed molds or converted to compact moldings.

The process according to the invention is also particularly suitable for the production of soft PU foam moldings. To this end, the reaction mixture is introduced into an expediently metal, heatable mold at from 15° to 80° C., preferably at from 30° to 65° C. The mold temperature is usually from 20° to 90° C., preferably from 35° to 70° C. The reaction mixture can be cured with compaction, for example at a degree of compaction of from 1.1 to 8, preferably from 2 to 6, in particular from 2.2 to 4, in the closed mold.

The cellular or compact moldings of polyisocyanate polyaddition products produced from highly reactive polyoxyalkylene-polyols (ai) according to the invention or mixtures of (ai) and conventional polyoxyalkylene-polyols (aii) are readily demoldable, have an improved surface and have absolutely no odor problems. Compact moldings have a lower Shore hardness than products made from conventional polyoxyalkylene-polyols. The cellular PU elastomers and PU foams, preferably soft PU foams, do not contain any chlorofluorocarbons as blowing gas.

The cellular PU elastomers have densities of from about 0.76 to 1.0 $g/cm^3$, preferably from 0.9 to 1.0 $g/cm^3$, it being possible for the density of filler-containing products to achieve higher values, for example up to 1.4 $g/cm^3$ or more. Moldings made from cellular elastomers of this type are used in the automotive industry, for example as headrests, external parts, e.g. rear spoilers and bumpers, and internal paneling, and as shoe soles.

The rigid, semirigid and preferably soft, flexible PU foams produces and the corresponding structural foams have a density of from 0.02 to 0.75 $g/cm^3$ the density of the foams preferably being from 0.025 to 0.24 $g/cm^3$ in particular from 0.03 to 0.1 $g/cm^3$ and the density of the structural foams preferably being from 0.08 to 0.75 $g/cm^3$, in particular from 0.24 to 0.6 $g/cm^3$. The foams and structural foams are used, for example, in the vehicle industries, e.g. automotive, aerospace and shipbuilding industries, the furniture industry and the sports equipment industry, as, for example, cushioning materials, housing parts, ski boot inners, ski cores, inter alia. They are particularly suitable as insulation materials in the construction and refrigeration sectors, for example as the middle layer of sandwich elements or for foam-filling refrigerator and freezer housings.

EXAMPLES

Preparation of polyoxypropylene-polyoxyethylene-polyols

Example 1

Preparation of an N,N-dimethyl-1,3-propanediamine-initiated polyoxypropylene-polyoxyethylene-polyol containing 21% by weight of ethylene oxide units, based on the weight of the alkylene oxide units, in the ethylene oxide end block.

138 g of N,N-dimethyl-1,3-propanediamine were warraed to 105° C. under a nitrogen atmosphere in a 10 l stirred autoclave, and 157 g of 1,2-propylene oxide were added. When the reaction of the 1,2-propylene oxide was complete and the primary amino group had been saturated, 34.8 g of 45% strength by weight aqueous potassium hydroxide solution were added, and the alkoxide was formed under a reduced pressure of 1 mbar at 105° C. for 2 hours.

3957 g of 1,2-propylene oxide were subsequently added at 105° C. over the course of 6 hours. After a reaction-completion phase of 3 hours, the mixture was degassed for 15 minutes at 105° C. under a reduced pressure of 1 mbar, the stirred autoclave was filled with nitrogen to a pressure of 2.5 bar, and 971 g of ethylene oxide were metered in at 105° C. over the course of 2 hours. After a reaction-completion time of 1 hour, the mixture was degassed at 105° C. and 1 mbar in order to remove the remaining ethylene oxide.

In order to remove the catalyst, the polyoxypropylene-polyoxyethylene-polyol was stirred with 200 g of synthetic magnesium silicate and 50 g of water, and the solids were removed by pressure filtration. After subsequent removal of the water of reaction by distillation at 100° C. and 1 mbar over the course of 2 hours, 1500 ppm of di-tert-butyl-p-cresol were added to the polyoxypropylene-polyoxyethylene-polyol for stabilization.

The polyoxypropylene-polyoxyethylene-polyol obtained had a hydroxyl number of 36, corresponding to a molecular weight of approximately 3120, a viscosity of 520 mPa.s at 25° C., a pH of 11.5 and a residual water content of 0.01% by weight.

Example 2

Preparation of an N,N-dimethyl-1,4-butanediamine-initiated polyoxypropylene-polyoxyethylene-polyol containing 21% by weight of ethylene oxide units, based on the weight of the alkylene oxide units, in the ethylene oxide end block.

89 g of N,N-dimethyl-1,4-butanediamine were warmed to 105° C. under a nitrogen atmosphere in a 10 l stirred autoclave, and 90 g of 1,2-propylene oxide were added. When the reaction of the 1,2-propylene oxide was complete and the primary amino group had been saturated, 20 g of 45% strength by weight aqueous potassium hydroxide solution were added, and the alkoxide was formed under a reduced pressure of 1 mbar at 105° C. for 2 hours.

2246 g of 1,2-propylene oxide were subsequently added at 105° C. over the course of 6 hours. After a reaction-completion phase of 3 hours, the mixture was degassed for 15 minutes at 105° C. under a reduced pressure of 1 mbar, the stirred autoclave was filled with nitrogen to a pressure of 2.5 bar, and 554 g of ethylene oxide were metered in at 105° C. over the course of 2 hours. After a reaction-completion time of 1 hour, the mixture was degassed at 105° C. and 1 mbar in order to remove the remaining ethylene oxide.

In order to remove the catalyst, the polyoxypropylene-polyoxyethylene-polyol was stirred with 120 g of synthetic magnesium silicate and 40 g of water, and the solids were removed by pressure filtration. After subsequent removal of the water of reaction by distillation at 100° C. and 1 mbar over the course of 2 hours, 1500 ppm of di-tert-butyl-p-cresol were added to the polyoxypropylene-polyoxyethylene-polyol for stabilization.

The polyoxypropylene-polyoxyethylene-polyol obtained had a hydroxyl number of 33, corresponding to a molecular weight of approximately 3400, a viscosity of 670 mPa.s at 25° C., a pH of 10.7 and a residual water content of 0.02% by weight.

Example 3

Preparation of an N,N-dimethyldipropylenetriamine-initiated polyoxypropylene-polyoxyethylene-polyol containing 21% by weight of ethylene oxide units, based on the weight of the alkylene oxide units, in the ethylene oxide end block.

114 g of N,N-dimethyldipropylenetriamine were warmed to 105° C. under a nitrogen atmosphere in a 10 l stirred autoclave, and 125 g of 1,2-propylene oxide were added. When the reaction of the 1,2-propylene oxide was complete and the primary and secondary amino groups had been saturated, 33.1 g of 45% strength by weight aqueous potassium hydroxide solution were added, and the alkoxide was formed under a reduced pressure of 1 mbar at 105° C. for 2 hours.

4140 g of 1,2-propylene oxide were subsequently added at 105° C. over the course of 6 hours. After a reaction-completion phase of 3 hours, the mixture was degassed for 15 minutes at 105° C. under a reduced pressure of 1 mbar, the stirred autoclave was filled with nitrogen to a pressure of 2.5 bar, and 1159 g of ethylene oxide were metered in at 105° C. over the course of 2 hours. After a reaction-completion time of 1 hour, the mixture was degassed for 30 minutes at 1 mbar and 105° C. in order to remove the remaining ethylene oxide.

In order to remove the catalyst, the polyoxypropylene-polyoxyethylene-polyol was stirred with 200 g of synthetic magnesium silicate and 50 g of water, and the solids were removed by pressure filtration. After subsequent removal of the water of reaction by distillation at 100° C. and 1 mbar over the course of 2 hours, 1500 ppm of di-tert-butyl-p-cresol were added to the polyoxypropylene-polyoxyethylene-polyol for stabilization.

The polyoxypropylene-polyoxyethylene-polyol obtained had a hydroxyl number of 29.5, corresponding to a molecular weight of approximately 5700, a viscosity of 1210 mPa·s at 25° C., a pH of 11.3 and a residual water content of 0.03% by weight.

Example 4

Preparation of an N,N-dimethyldipropylenetriamine-initiated polyoxypropylene-polyoxyethylene-polyol containing 5% by weight of ethylene oxide units, based on the weight of the alkylene oxide units, in the ethylene oxide end block.

103 g of N,N-dimethyldipropylenetriamine were warmed to 105° C. under a nitrogen atmosphere in a 10 l stirred autoclave, and 113 g of 1,2-propylene oxide were added. When the reaction of the 1,2-propylene oxide was complete and the primary and secondary amino groups had been saturated, 37.4 g of 45% strength by weight aqueous potassiumhydroxide solution were added, and the alkoxide was formed under a reduced pressure of 1 mbar at 105° C. for 2 hours.

5110 g of 1,2-propylene oxide were subsequently added at 105° C. over the course of 6 hours. After a reaction-completion phase of 3 hours, the mixture was degassed for 15 minutes at 105° C. under a reduced pressure of 1 mbar, the stirred autoclave was filled with nitrogen to a pressure of 2.5 bar, and 280 g of ethylene oxide were metered in at 105° C. over the course of 2 hours. After a reaction-completion time of 1 hour, the mixture was degassed at 1 mbar and 105° C. in order to remove the remaining ethylene oxide.

In order to remove the catalyst, the polyoxypropylene-polyoxyethylene-polyol was stirred with 200 g of synthetic magnesium silicate and 50 g of water, and the solids were removed by pressure filtration. After subsequent removal of the water of reaction by distillation at 100° C. and 1 mbar over the course of 2 hours, 1500 ppm of di-tert-butyl-p-cresol were added to the polyoxypropylene-polyoxyethylene-polyol for stabilization.

The polyoxypropylene-polyoxyethylene-polyol obtained had a hydroxyl number of 29, corresponding to a molecular weight of approximately 5800, a viscosity of 1100 mPa·s at 25° C., a pH of 10.7 and a residual water content of 0.02% by weight.

Example 5

Preparation of an N,N-dimethyldipropylenetriamine-initiated polyoxypropylene-polyoxyethylene-polyol containing 5% by weight of ethylene oxide units, based on the weight of the alkylene oxide units, in the ethylene oxide end block.

The procedure was similar to that of Example 4, but the starting materials were used in the following amounts:

155.0 g of N,N-dimethyldipropylenetriamine,
174.0 g of 1,2-propylene oxide,
37.5 g of 45% strength by weight aqueous potassium hydroxide solution,
5000.0 g of 1,2-propylene oxide and
280.0 g of ethylene oxide.

The polyoxypropylene-polyoxyethylene-polyol obtained had a hydroxyl number of 38, corresponding to a molecular weight of approximately 4430, a viscosity of 800 mPa·s at 25° C., a pH of 11.2 and a residual water content of 0.02% by weight.

Comparative Example I

Preparation of a piperazine-initiated polyoxypropylene-polyoxyethylene-polyol containing 21% by weight of ethylene oxide units, based on the weight of the alkylene oxide units, in the ethylene oxide end block.

843 g of piperazine were warmed to 100° C. under a nitrogen atmosphere in a 66 l stirred autoclave, and 654 g of 1,2-propylene oxide were added. When the reaction of the 1,2-propylene oxide was complete and the primary amino groups had been saturated, 416 g of 45% strength by weight aqueous potassium hydroxide solution were added, and the alkoxide was formed under a reduced pressure of 10 mbar at 100° C. for 3 hours.

30,670 g of 1,2-propylene oxide were subsequently added at 107° C. over the course of 8 hours. After a reaction-completion phase of 3 hours, the mixture was degassed for 30 minutes at 107° C. under a reduced pressure of 10 mbar, the stirred autoclave was filled with nitrogen to a pressure of 2.5 bar, and 7830 g of ethylene oxide were metered in at 107° C. over the course of 2 hours. After a reaction-completion time of 1 hour, the mixture was degassed at 107° C. and 10 mbar in order to remove the remaining ethylene oxide.

In order to remove the catalyst, the polyoxypropylene-polyoxyethylene-polyol was stirred with 1200 g of synthetic magnesium silicate and 600 g of water, and the solids were removed by pressure filtration. After subsequent removal of the water of reaction by distillation at 100° C. and 10 mbar over the course of 4 hours, 1500 ppm of di-tert-butyl-p-cresol were added to the polyoxypropylene-polyoxyethylene-polyol for stabilization.

The polyoxypropylene-polyoxyethylene-polyol obtained had a hydroxyl number of 27, corresponding to a molecular weight of approximately 4150, a viscosity of 1060 mPa·s at 25° C., a residual alkali content of 2 ppm (measured spectroscopically) and a residual water content of 0.015% by weight.

Comparative Example II

Preparation of a triethanolamine-initiated polyoxypropylene-polyoxyethylene-polyol containing 21% by weight of ethylene oxide units, based on the weight of the alkylene oxide units, in the ethylene oxide end block.

110 g of triethanolamine were warmed to 105° C. under a nitrogen atmosphere in a 10 l stirred autoclave, and 33.1 g of 45% strength by weight aqueous potassium hydroxide solution were added, and the alkoxide was formed under a reduced pressure of 10 mbar at 90° C. for 1 hour.

4269 g of 1,2-propylene oxide were subsequently added at 110° C. over the course of 6 hours. After a reaction-completion phase of 3 hours, the mixture was degassed for 15 minutes at 110° C. under a reduced pressure of 1 mbar, the stirred autoclave was filled with nitrogen to a pressure of 2.5 bar, and 1159 g of ethylene oxide were metered in at 110° C. over the course of 2 hours. After a reaction-completion time of 1 hour, the mixture was degassed for 30 minutes at 110° C. and 1 mbar in order to remove the remaining ethylene oxide.

In order to remove the catalyst, the polyoxypropylene-polyoxyethylene-polyol was stirred with 200 g of synthetic magnesium isilicate and 50 g of water, and the solids were removed by pressure filtration. After subsequent removal of the water of reaction by distillation at 100° C. and 1 mbar over the course of 2 hours, 1500 ppm of di-tert-butyl-p-cresol were added to the polyoxypropylene-poilyoxyethylene-polyol for stabilization.

The polyoxypropylene-polyoxyethylene-polyol obtained had a hydroxyl number of 28, corresponding to a molecular weight of approximately 6010, a viscosity of 1130 mPa.s at 25° C., a pH of 10.7 and a residual water content of 0.01% by weight.

Comparative Example III

Preparation of a triethanolamine-initiated polyoxypropylene-polyoxyethylene-polyol containing 5% by weight of ethylene oxide units, based on the weight of the alkylene oxide units, in the ethylene oxide end block.

99.4 g of triethanolamine were warmed to 105° C. under a nitrogen atmosphere in a 10 l stirred autoclave, and 37.4 g of 45% strength by weight aqueous potassium hydroxide solution were added, and the alkoxide was formed under a reduced pressure of 1 mbar at 90° C. for 1 hour.

5230 g of 1,2-propylene oxide were subsequently added at 110° C. over the course of 6 hours. After a reaction-completion phase of 3 hours, the mixture was degassed for 15 minutes at 110° C. under a reduced pressure of 1 mbar, the stirred autoclave was filled with nitrogen to a pressure of 2.5 bar, and 281 g of ethylene oxide were metered in at 110° C. over the course of 2 hours. After a reaction-completion time of 1 hour, the mixture was degassed for 30 minutes at 110° C. and 1 mbar in order to remove the remaining ethylene oxide.

In order to remove the catalyst, the polyoxypropylene-polyoxyethylene-polyol was stirred with 200 g of synthetic magnesium silicate and 50 g of water, and the solids were removed by pressure filtration. After subsequent removal of the water of reaction by distillation at 100° C. and 1 mbar over the course of 2 hours, 1500 ppm of di-tert-butyl-p-cresol were added to the polyoxypropylene-polyoxyethylene-polyol for stabilization.

The polyoxypropylene-polyoxyethylene-polyol obtained had a hydroxyl number of 28, corresponding to a molecular weight of approximately 6010, a viscosity of 1090 mPa.s at 25° C., a pH of 9.7 and a residual water content of 0.025% by weight.

Comparative Example IV

Preparation of a triethanolamine-initiated polyoxypropylene-polyoxyethylene-polyol containing 5% by weight of ethylene oxide units, based on the weight of the alkylene oxide units, in the ethylene oxide end block.

The procedure was similar to that of Comparative Example III, but the starting materials were used in the following amounts:

149.0 g of triethanolamine, 37.5 g of 45% strength by weight aqueous potassium hydroxide solution, 80.0 g of 1,2-propylene oxide and 281.0 g of ethylene oxide.

The polyoxypropylene-polyoxyethylene-polyol obtained had a hydroxyl number of 35, corresponding to a molecular weight of approximately 4800, a viscosity of 830 mPa.s at 25° C., a pH of 10.0 and a residual water content of 0.03% by weight.

Comparative Example V

Commercially available glycerol-initiated polyoxypropylene-polyoxyethylene-polyol containing 14% by weight of ethylene oxide units, based on the weight of the alkylene oxide units, in the ethylene oxide end block, and having a hydroxyl number of 27, corresponding to a molecular weight of 6230, a viscosity of 700 mPa.s at 25° C., a pH of 7.5 and a residual water content of 0.03% by weight.

Comparative Example VI

Commercially available glycerol-initiated polyoxypropylene-polyoxyethylene-polyol containing 14% by weight of ethylene oxide units, based on the weight of the alkylene oxide units, in the ethylene oxide end block, and having a hydroxyl number of 35, corresponding to a molecular weight of 4810, a viscosity of 840 mPa.s at 25° C., a pH of 8.0 and a residual water content of 0.03% by weight.

Comparative Example VII

Commercially available 1,3-propylene glycol-initiated polyoxypropylene-polyoxyethylene-polyol containing 21% by weight of ethylene oxide units, based on the weight of the alkylene oxide units, in the ethylene oxide end block, and having a hydroxyl number of 29, corresponding to a molecular weight of 3870, a viscosity of 800 mPa.s at 25° C. , a pH of 8 5 and a residual water . content of 0.03% by weight.

Examples 6 and 7 and Comparative Examples VIII and IX

Preparation of semirigid, cellular polyisocyanate polyaddition products.

To produce PU moldings from the polyoxypropylenepolyoxyethylene polyols of Examples 1 and 2 and Comparative Examples I and VII, the following system components were used:

| Component A: mixture comprising | | | | |
|---|---|---|---|---|
| | Example 6 [parts by weight] | Example 7 [parts by weight] | Comparative Example VIII [parts by weight] | Comparative Example IX [parts by weight] |
| Polyoxypropylene-polyoxyethylene-polyol | | | | |
| according to Example 1 | 61.00 | — | — | — |
| according to Example 2 | — | 61.00 | — | — |
| according to Comparative Example I | — | — | 61.00 | — |
| according to Comparative Example VII | — | — | — | 61.00 |
| Glycerol-initiated polyoxypropylene-polyoxyethylene (14% by weight)-polyol having a hydroxyl number of 35 (molecular weight 4800) | 27.00 | 27.00 | 27.00 | 27.00 |
| 1,4-Butanediol | 10.00 | 10.00 | 10.00 | 10.00 |
| Ethylene glycol | 0.70 | 0.70 | 0.70 | 0.70 |
| Water | 0.35 | 0.35 | 0.35 | 0.35 |
| Dibutyltin dilaurate | 0.02 | 0.02 | 0.02 | 0.02 |
| Diazabicyclo[2.2.2]octane | — | — | 0.2 | 0.4 |

Component B

Urethane group-containing polyisocyanate mixture having an NCO group content of 23.0% by weight, prepared by reacting 4,4'-MDI with a mixture of dipropylene glycol and polyoxypropylene glycols having a molecular weight of up to 500.

To produce the semirigid, cellular polyisocyanate polyaddition products, components A and B were mixed vigorously at 23° C. in the amounts given below, the reaction mixture was introduced into an open cup or mold, where it was allowed to expand and cure.

In order to determine the initiation time, setting time, rise time and free density, free-foamed cup foams were produced at room temperature. In order to determine the buckle time and the mechanical properties of the polyurethane parts, the reaction mixture was also introduced into a metal mold having the internal dimensions 20×20×1 cm, held at 50° C., and the mold was closed. After a dwell time of 2 minutes, the PU molding was removed.

Examples 6a to 6e

Mixing ratio at index 100=100 parts by weight Component A: 62.38 parts by weight of component B

| | a | b | c | d | e |
|---|---|---|---|---|---|
| Mixing ratio 100: | 58 | 60 | 62 | 64 | 66 |
| Initiation time (s) | 18 | 18 | 17 | 17 | 17 |
| Setting time (s) | 27 | 27 | 27 | 27 | 27 |
| Rise time (s) | 45 | 47 | 49 | 50 | 56 |
| Free density (g/l) | 265 | 236 | 221 | 200 | 185 |
| Buckle time (min) | >8 | 5.0 | 4.0 | 4.0 | 4.0 |
| Sheet weight (g) | 257 | 258 | 257 | 250 | 247 |
| Tensile strength (N/mm$^2$) | 1.6 | 2.5 | 3.7 | 4.4 | 4.4 |
| Elongation (%) | 75 | 210 | 295 | 300 | 290 |
| Tear propagation strength (N/mm) | 5.3 | 7.0 | 7.2 | 7.3 | 6.6 |
| Shrinkage (mm) | −1 | −1 | −1.2 | −1 | 0.8 |
| Shore A | 59 | 62 | 61 | 60 | 56 |

Examples 7a to 7e

Mixing ratio at index 100=100 parts by weight Component A: 62.38 parts by weight of component B

| | a | b | c | d | e |
|---|---|---|---|---|---|
| Mixing ratio 100: | 58 | 60 | 62 | 64 | 66 |
| Initiation time (s) | 15 | 14 | 14 | 16 | 14 |
| Setting time (s) | 23 | 21 | 21 | 22 | 19 |
| Rise time (s) | 46 | 45 | 44 | 49 | 48 |
| Free density (g/l) | 260 | 233 | 215 | 207 | 195 |
| Buckle time (min) | 4.8 | 3.8 | 4.0 | 4.0 | 3.5 |
| Sheet weight (g) | 245 | 246 | 241 | 241 | 236 |
| Tensile strength (N/mm$^2$) | 1.9 | 3.8 | 4.0 | 4.4 | 4.2 |
| Elongation (%) | 150 | 300 | 290 | 290 | 270 |
| Tear propagation strength (N/mm) | 5.8 | 7.4 | 7.1 | 7.2 | 6.6 |
| Shrinkage (mm) | −0.5 | 0 | 0 | −0.5 | −1 |
| Shore A | 56 | 60 | 58 | 60 | 58 |

Comparative Examples VIIIa to VIIIe

Mixing ratio at index 100=100 parts by weight Component A: 62.26 parts by weight of component B

| | a | b | c | d | e |
|---|---|---|---|---|---|
| Mixing ratio 100: | 58 | 60 | 62 | 64 | 66 |
| Initiation time (s) | 18 | 18 | 16 | 17 | 17 |
| Setting time (s) | 25 | 24 | 25 | 24 | 25 |
| Rise time (s) | 45 | 48 | 49 | 52 | 54 |
| Free density (g/l) | 242 | 223 | 201 | 182 | — |
| Buckle time (min) | 6.0 | 4.5 | 5.5 | 7.0 | 6.5 |
| Sheet weight (g) | 242 | 236 | 241 | 241 | 239 |
| Tensile strength (N/mm$^2$) | 3.6 | 3.8 | 3.2 | 4.0 | 3.6 |
| Elongation (%) | 300 | 290 | 240 | 290 | 270 |
| Tear propagation strength (N/mm) | 7.1 | 7.0 | 8.9 | 8.2 | 7.7 |
| Shrinkage (mm) | −0.8 | −0.3 | −0.5 | −0.5 | 0.0 |
| Shore A | 66 | 67 | 69 | 72 | 68 |

Comparative Examples IXa to IXe

Mixing ratio at index 100=100 parts by weight Component A: 60.74 parts by weight of component B

|  | a | b | c | d | e |
|---|---|---|---|---|---|
| Mixing ratio 100: | 57 | 59 | 61 | 63 | 65 |
| Initiation time (s) | 15 | 15 | 17 | 15 | 16 |
| Setting time (s) | 20 | 20 | 22 | 21 | 21 |
| Rise time (s) | 43 | 44 | 47 | 50 | 54 |
| Free density (g/l) | 272 | 244 | 233 | — | 187 |
| Buckle time (min) | 3.5 | 3.3 | 3.5 | 3.8 | 3.5 |
| Sheet weight (g) | 246 | 252 | 249 | 245 | 234 |
| Tensile strength (N/mm$^2$) | 2.9 | 4.7 | 3.8 | 4.7 | 4.7 |
| Elongation (%) | 235 | 320 | 250 | 270 | 260 |
| Tear propagation strength (N/mm) | 9.1 | 8.6 | 9.1 | 6.2 | 3.3 |
| Shrinkage (mm) | −1.0 | −0.5 | −0.8 | −1.0 | −1.0 |
| Shore A | 61 | 66 | 66 | 66 | 65 |

EXAMPLES 8 TO 23
Production of soft PU foams from the polyoxypropylene-polyoxyethylene-polyols prepared in accordance with Example 3 to 5
Component A: mixture comprising

| | Polyoxypropylene-polyoxyethylene-polyol | | | Additives | |
|---|---|---|---|---|---|
| Component A No. | according to Example | Amount [parts by weight] | Water [parts by weight] | Type | Amount [parts by weight] |
| A1 | 3 | 94.2 | 3.3 | Lu 2000[1] | 2.5 |
| A2 | 3 | 96.7 | 3.3 | — | — |
| A3 | 3 | 96.6 | 3.3 | B 8680[2] | 0.1 |
| A4 | 3 | 96.5 | 3.3 | B 8680 | 0.2 |
| A5 | 3 | 96.4 | 3.3 | B 8680 | 0.3 |
| A6 | 3 | 96.4 | 3.3 | B 8680 | 0.2 |
| A7 | 4 | 96.7 | 3.3 | — | — |
| A8 | 4 | 97.7 | 2.3 | — | — |
| A9 | 4 | 97.7 | 2.3 | — | — |
| A10 | 4 | 96.7 | 3.3 | — | — |
| A11 | 4 | 86.7 | 3.3 | Lu 2040[3] | 10 |
| A12 | 5 | 97.7 | 2.3 | — | — |
| A13 | 5 | 96.7 | 3.3 | — | — |

Additives:
[1]Lupranol ® 2000, cell opener polyol from BASF AG
[2]Tegostab ® 8680 silicone stabilizer from Goldschmidt AG, Essen
[3]Lupranol ® 2040, soft block foam polyether-polyol from BASF AG Component B:

B1: Mixture of diphenylmethane diisocyanates and polyphenyl-polymethylene polyisocyanates (crude MDI) having an NCO content of 32.4% by weight and an MDI isomer content of 74% by weight.

B2: Urethane group-containing polyisocyanate mixture having an NCO content of 26.3% by weight, prepared by reacting a crude MDI having an MDI isomer content of 39.5% by weight with a polyoxypropylene-polyoxyethylene-triol having a hydroxyl number of 55.

To produce the soft PU foams, components A and B were mixed vigorously at 23° C. in amounts corresponding to the NCO index given below, the reaction mixture was introduced into an open cup or mold, where it was allowed to expand and cure.

| | Production of soft PU foams in an open cup. | | | | | | |
|---|---|---|---|---|---|---|---|
| Example | Component A | Component B | NCO index | Initiation time [sec] | Setting time [sec] | Rise time [sec] | Density [g/liter] |
| 8 | A1 | B1 | 80 | 14 | 50 | 85 | 52 |
| 9 | A2 | B1 | 80 | 14 | 55 | 90 | 52 |
| 10 | A3 | B1 | 80 | 14 | 45 | 90 | 50 |
| 11 | A4 | B1 | 80 | 14 | 45 | 85 | 48 |
| 12 | A5 | B1 | 80 | 13 | 45 | 85 | 49 |
| 13 | A6 | B2 | 90 | 13 | 45 | 85 | 49 |
| 14 | A7 | B2 | 90 | 16 | 60 | 95 | 64 |
| 15 | A8 | B2 | 100 | 20 | 90 | 165 | 76 |
| 16 | A9 | B2 | 80 | 20 | 85 | 170 | 67 |
| 17 | A10 | B2 | 100 | 18 | 55 | 95 | 65 |
| 18 | A11 | B2 | 100 | 19 | 60 | 105 | 66 |
| 19 | A12 | B1 | 80 | 16 | 70 | 90 | 77 |
| 20 | A13 | B2 | 100 | 13 | 50 | 85 | 50 |

Production of soft PU foam moldings

The reaction mixture was introduced into a metal mold having the internal dimensions 40×40×10 cm, held at 50° C., the mold was closed, and the reaction mixture was allowed to expand. After a dwell time of 5 minutes, soft, elastic foam moldings were removed.

|  | Ex. 21 | Ex. 22 | Ex. 23 |
|---|---|---|---|
| Formulation according to Example | 12 | 19 | 20 |
| Density g/l in accordance with DIN 53 420 | 53.8 | 73.9 | 49.3 |
| Tensile strength kPa in accordance with DIN 53 571 | 119 | 82.4 | 109 |
| Elongation % in accordance with DIN 53 571 | 105 | 109 | 114 |
| Compression set % in accordance with DIN 53 572 | 9.7 | 8.8 | 12.3 |
| Compressive strength 40% kPa in accordance with DIN 53 577 | 7.0 | 5.2 | 5.0 |

B2: Urethane group-containing polyisocyanate mixture having an NCO content of 26.3% by weight, prepared by reacting a crude MDI having an MDI isomer content of 39.5% by weight with a polyoxypropylene-polyoxyethylene-triol having a hydroxyl number of 55.

To produce the soft PU foams, components A and B were mixed vigorously at 23° C. in amounts corresponding to the NCO index given below, the reaction mixture was introduced into an open cup, where it was allowed to expand and cure.

COMPARATIVE EXAMPLES X TO XXIII
Production of soft PU foams from the polyoxypropylene-polyoxyethylene-polyols prepared in accordance with Comparative Examples II to VI
Component A: mixtures comprising

| Component A No. | Polyoxypropylene-polyoxyethylene-polyol according to Comparative Example | Amount [parts by weight] | Water [parts by weight] | Additives Type | Amount [parts by weight] |
|---|---|---|---|---|---|
| AI | II | 94.2 | 3.3 | Lu 2000 | 2.5 |
| AII | II | 96.7 | 3.3 | — | — |
| AIII | II | 96.5 | 3.3 | DABCO[4] | 0.2 |
| AIV | II | 96.4 | 3.3 | DABCO B 8680 | 0.2 0.1 |
| AV | II | 96.6 | 3.3 | B 8680 | 0.1 |
| AVI | II | 96.5 | 3.3 | DABCO B 8680 | 0.2 0.1 |
| AVII | III | 94.2 | 3.3 | Lu 2000 | 2.5 |
| AVIII | IV | 94.2 | 3.3 | Lu 2000 | 2.5 |
| AIX | V | 94.2 | 3.3 | Lu 2000 | 2.5 |
| AX | V | 96.7 | 3.3 | — | — |
| AXI | V | 96.7 | 3.3 | — | — |
| AXII | VI | 94.2 | 3.3 | Lu 2000 | 2.5 |
| AXIII | VI | 96.7 | 3.3 | — | — |
| AXIV | VI | 96.7 | 3.3 | — | — |

Additives:
[4] Diazabicyclo[2.2.2]octane, commercial product from Air Products

Component B:

B1: Mixture of diphenylmethane diisocyanates and polyphenyl-polymethylene polyisocyanates (crude MDI) having an NCO content of 32.4% by weight and an MDI isomer content of 74% by weight.

| Comparative Example | Component A | Component B | NCO index | Initiation time [sec] | Setting time [sec] | Rise time [sec] |
|---|---|---|---|---|---|---|
| X | AI | B1 | 80 | 30 | 180 | collapse |
| XI | AII | B1 | 80 | 35 | 180 | collapse |
| XII | AIII | B1 | 80 | 16 | 55 | collapse |
| XIII | AIV | B1 | 80 | 16 | 55 | 150 |
| XIV | AV | B1 | 80 | 35 | 170 | collapse |
| XV | AVI | B1 | 80 | 25 | — | collapse |
| XVI | AVII | B1 | 80 | 60 | 245 | collapse |
| XVII | AVIII | B1 | 80 | 55 | 240 | collapse |
| XVIII | AIX | B1 | 80 | >60 | does not set | — |
| XIX | AX | B1 | 80 | >60 | does not set | — |
| XX | AXI | B2 | 90 | >120 | does not set | — |
| XXI | AXII | B1 | 80 | >60 | does not set | — |
| XXII | AXIII | B1 | 80 | >60 | does not set | — |
| XXIII | AXIV | B2 | 90 | >120 | does not set | — |

The Examples and Comparative Examples show that the reactivity of the polyoxyalkylene-polyols according to the invention is significantly greater than that of the comparable amine-initiated polyoxyalkylene-polyols with piperazine and triethanolamine as initiator molecules.

While the piperazine- and triethanolamine-initiated polyoxyalkylene-polyols do not allow the production of PU moldings in the absence of low-molecular-weight tertiary amines as catalysts, this is easily possible using the highly reactive polyoxypropylene-polyoxyethylene-polyols according to the invention.

The highly reactive polyoxyalkylene-polyols according to the invention based on N,N-dimethyldiaminopropane or -diaminobutane can, when mixed with a glycerol-initiated polyoxypropylene-polyoxyethylene-polyol, be used for the production of semirigid, cellular PU moldings, while the N,N-dimethyldipropylenetriamine-initiated polyoxyalkylene-polyols can easily be converted to soft PU foams in chlorofluorocarbon-free PU formulations. It is apparent here that the polyoxypropylene-polyoxyethylene-polyols according to the invention are sufficiently reactive for the catalyst-free production of soft PU foams, even at an ethylene oxide unit content in the end block of only 5% by weight, which is very low for soft PU foams. By contrast, triethanolamine-initiated polyoxypropylene-polyoxyethylene-polyols having an ethylene oxide unit content of 21% by weight in the end block can only be converted to PU foams if conventional amine catalysts are used. Amine-free polyoxyalkylene-polyols prepared using polyhydric alcohols as initiator molecules are likewise impossible to convert to foams without using a catalyst. The polyisocyanate polyaddition reaction only commences after an initiation time of more than one minute, and the reaction mixture no longer sets.

We claim:

1. A highly reactive polyoxyalkylene-polyol prepared by oxyalkylation of an initiator molecule containing, in bonded form, at least 2 reactive hydrogen atoms and at least one tertiary amino group bonded via a spacer bridge, by means of at least one alkylene oxide, said initiator molecule being N,N-dimethyldipropylenetriamine.

2. A highly reactive polyoxyalkylene-polyol as claimed in claim 1, wherein the alkylene oxide used for its preparation is ethylene oxide, 1,2-propylene oxide or a mixture of ethylene oxide and 1,2-propylene oxide.

3. A highly reactive polyoxyalkylene-polyol as claimed in claim 1, which has a functionality of from 2 to 3 and a molecular weight of from 2800 to 6200.

* * * * *